July 26, 1960 V. K. ELORANTA 2,946,270
PHOTOGRAPHIC APPARATUS
Filed May 7, 1959 5 Sheets-Sheet 1

INVENTOR.
Vaito K. Eloranta
BY Brown and Mikulka
and
Robert E. Corb
ATTORNEYS

July 26, 1960 V. K. ELORANTA 2,946,270
PHOTOGRAPHIC APPARATUS
Filed May 7, 1959 5 Sheets-Sheet 2
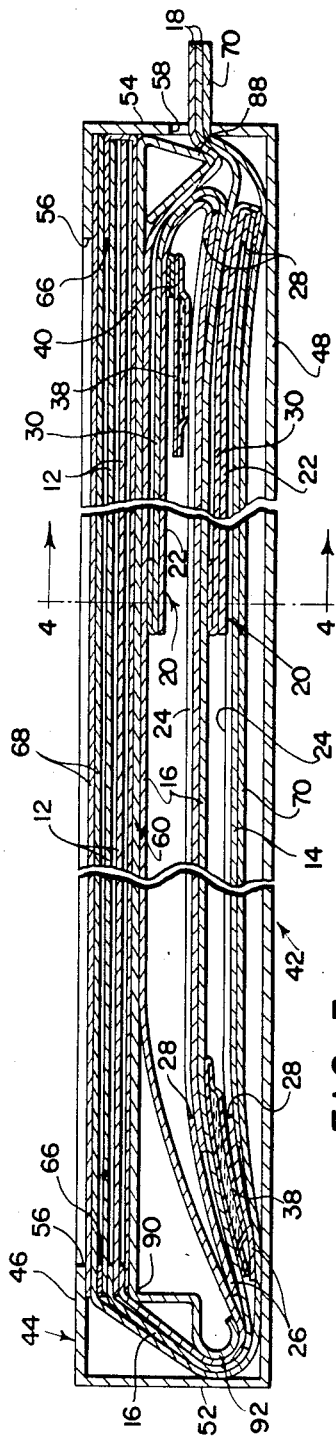
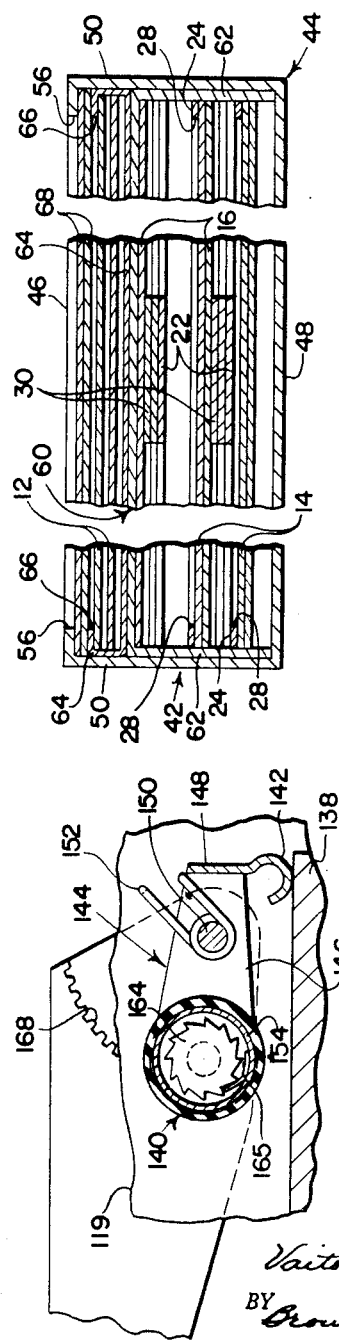
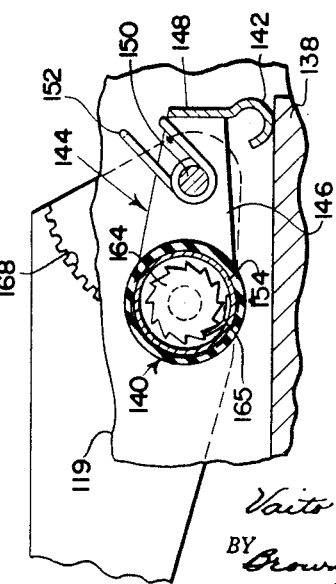
INVENTOR.
Vaito K. Eloranta
BY
ATTORNEYS July 26, 1960   V. K. ELORANTA   2,946,270
PHOTOGRAPHIC APPARATUS Filed May 7, 1959   5 Sheets-Sheet 3

INVENTOR.
Vaito K. Eloranta
BY
Brown and Mikulka
and
Robert E. Corb
ATTORNEYS

July 26, 1960

V. K. ELORANTA 2,946,270

PHOTOGRAPHIC APPARATUS

Filed May 7, 1959

INVENTOR.
Vaito K. Eloranta
BY Brown and Mikulka
and
Robert E. Corb
ATTORNEYS

United States Patent Office 2,946,270
Patented July 26, 1960

2,946,270

PHOTOGRAPHIC APPARATUS

Vaito K. Eloranta, Needham, Mass., assignor to Polaroid Corporation, Cambridge, Mass., a corporation of Delaware Filed May 7, 1959, Ser. No. 811,722

30 Claims. (Cl. 95—13)

This invention relates to novel photographic apparatus and more particularly to apparatus for exposing and processing photosensitive sheet materials.

The apparatus of the invention is of the type wherein the photosensitive elements of a film assemblage are exposed and thereafter processed by a preferably viscous fluid distributed between the photosensitvie element and another element comprising the film assemblage. The fluid is preferably spread in a thin layer between layers of the film assemblage by movement of the assemblage relative to and between a pair of juxtaposed pressure-applying members. In my copending U.S. application, Serial No. 757,976, filed August 29, 1958, there is shown similar apparatus embodying means for frictionally engaging at least a portion of a film assemblage for advancing at least said portion thereof into engagement with and between the pressure-applying members so that the portion may be employed for drawing the remainder of the film assemblage between the pressure-applying members to spread the processing fluid. This last-mentioned means is also adapted for applying compressive pressure to each film assemblage as it is moved between the pressure-applying members for controlling the distribution of the processing fluid within the assemblage.

An object of the invention is to provide, in photographic apparatus including fluid-spreading means for spreading a fluid in a layer between layers of a photographic film assemblage, a novel and improved device for advancing at least a portion of said film assemblage into engagement with said fluid-spreading means and engaging said assemblage during spreading of said fluid for controlling the distribution of said fluid within said assemblage.

Apparatus of the type with which the present invention is concerned is usually adapted to contain, expose and to process a plurality of film assemblages with at least a portion (designated a leader) of each assemblage initially arranged in stacked relation with the portions of other assemblages and adapted to be engaged and advanced between the pressure-applying members by the device of the invention. Accordingly, other objects of the invention are: to provide a device of the above type including means for frictionally engaging at least a portion of a film assemblage by applying compressive pressure to said portion and being movable for advancing said assemblage toward and into engagement with a fluid-spreading device, and means for applying compressive pressure to said assemblage during spreading of said fluid so as to control the distribution of said fluid; and to provide in the device of the above type pressure-applying means rotatable in frictional engagement with said portion of each assemblage for advancing said portion into engagement with said fluid-spreading device.

The device of the invention may be adapted to apply compressive pressure to every film assemblage both during advancement of a leader into engagement with a pressure-applying device and during spreading and distribution of the processing fluid. The compressive pressure required for distributing the processing fluid may be substantially less than is required to insure that the frictional force exerted on a leader is sufficient to advance a leader. Accordingly, another object of the invention is to provide a device of the above type including means for applying greater compressive pressure to the assemblage or portions thereof during advancement thereof into engagement with the pressure-applying device than during spreading and distribution of the processing fluid.

The means for distributing the processing fluid as it is being spread is required to be located more closely adjacent the fluid-spreading device than the means for advancing the film assemblage into engagement with the fluid-spreading device. Accordingly, other objects of the invention are: to provide an advancing and fluid-distributing device including means for engaging a portion of a film assemblage only during advancement of said film assemblage by said means into engagement with a fluid-spreading device and means for engaging and applying compressive pressure to said assemblage for distributing said processing fluid only during movement of said assemblage in engagement with said fluid-spreading device during spreading of said fluid; and to provide an advancing and fluid-distributing device of the foregoing type wherein said means for advancing said portion of said film assemblage applies greater compressive pressure to said portion than is applied to said film assemblage by said means for distributing said fluid.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

Fig. 3 is a fragmentary sectional view taken substantially midway between the sides of an assemblage of film units adapted to be employed in the apparatus of the invention;

Fig. 4 is a view taken along the line 4—4 of Fig. 3;

Fig. 10 is a fragmentary sectional view taken along the line 10—10 of Fig. 9.

Figure 1:
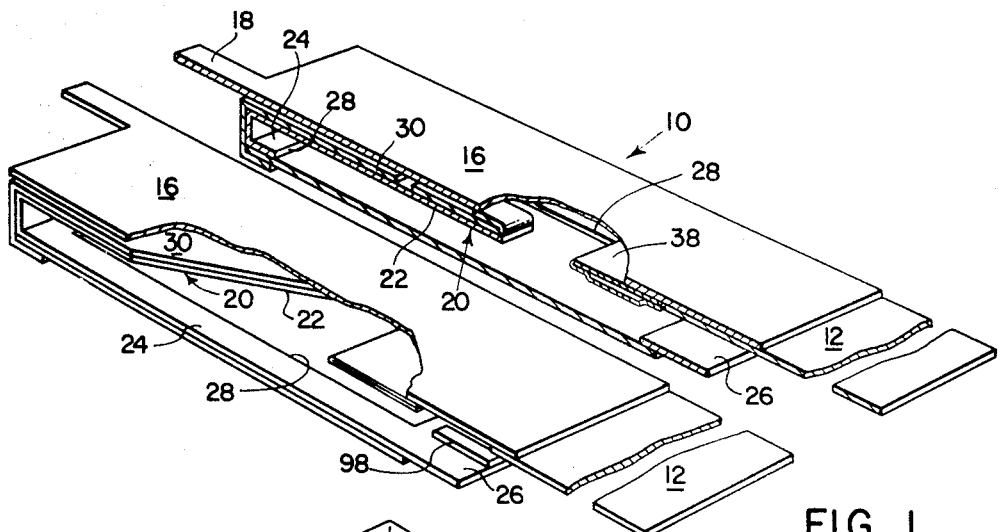
Figure 1 is a fragmentary perspective view of a photographic film unit adapted to be employed in the apparatus of the invention.

Reference is now made to Figures 1 through 4 of the drawings wherein there is illustrated a film unit adapted to be employed in the apparatus of the invention. Each film unit, designated 10, comprises a photosensitive sheet 12 and a second or image-receiving sheet 14. The photosensitive sheet is generally rectangular and comprises a layer of photosensitive material carried on a suitable support. The photosensitive material may comprise any of the materials usually employed in photography including, for example, the silver halides or other photosensitive heavy metal salts capable of having a developable latent image formed therein by exposure to actinic light, the ferric salts and the diazonium compounds. The support for the photosensitive layer may comprise any of the flexible sheet materials generally used for film base, including paper, plastics, metallic foils and the like, and is preferably opaque to light actinic to the photosensitive material or includes a layer which is opaque to actinic light. Second sheet 14 is at least coextensive in area with the area or frame of the photosensitive sheet which is to be exposed and also comprises a flexible sheet material such as paper, plastic and the like. The second sheet in the form shown is substantially equal in width to, but slightly shorter than, the photosensitive sheet and is also opaque to light actinic to the photosensitive material. While the second sheet may merely aid in the spreading of a fluid processing composition in a thin layer on the photosensitive sheet, in a preferred form of the film unit the second sheet is adapted to provide a support for a positive transfer image produced, for example, by a silver halide diffusion-transfer reversal process such as described in U.S. Patents Nos. 2,543,181, issued February 27, 1951, and 2,662,822, issued December 15, 1953, both in the name of Edwin H. Land. The second sheet accordingly may comprise an image-receiving layer such as described in the above-mentioned patents carried on a flexible support sheet.

Photosensitive sheet 12 is mounted on a first carrier sheet 16 formed of a flexible sheet material such as paper, plastic and the like, and preferably of a material such as glassine paper which has a highly calendered, smooth surface. First carrier sheet 16 may be adapted to perform a multiplicity of functions including providing a leader for connecting the photosensitive and second sheets, positioning the photosensitive sheets relative to one another, moving the film unit within a camera or other apparatus, withdrawing the film unit from the camera or apparatus, mounting a container of a fluid processing composition and, in one embodiment, collecting any excess processing fluid. In the form shown in Figs. 1 and 3, carrier sheet 16 is substantially equal in width to photosensitive sheet 12 and is provided at one end, called its leading end, with a narrower leader portion 18. The opposite or trailing end of the carrier sheet is secured to the leading end of photosensitive sheet 12. This may be accomplished by adhering the photosensitive sheet directly to the carrier sheet by a suitable adhesive or by providing a narrow connecting member or strip. In an alternative embodiment of film unit 10, carrier sheet 16 may be of sufficient length so as to extend behind and beyond the trailing edge of the photosensitive sheet providing a trailing end portion for collecting excess processing fluid in a manner to be described hereinafter. In this last-mentioned embodiment, the photosensitive and image-receiving sheets may be substantially equal in length.

A second carrier sheet 20 is provided for mounting second or image-receiving sheet 14 and, like first carrier sheet 16, is adapted to perform a multiplicity of functions which include determining the area of the photosensitive and second sheets which are to be processed by a layer of the processing fluid spread between the sheets. Carrier sheet 20 comprises a tapered leading end section 22, an intermediate section 24 at least coextensive with second sheet 14 and a relatively short trailing end section 26. Second sheet 14 is mounted on intermediate section 24 with the image-receiving layer of sheet 14 disposed adjacent carrier sheet 20. Intermediate section 24 is provided with a generally rectangular aperture 28 defining the area of the image-receiving sheet in contact with which the fluid processing composition is spread and wherein a transfer image may be produced. The lateral margins of intermediate section 24 bordering the sides of aperture 28 cooperate in a manner to be described for confining the processing fluid between the sheets and for controlling the thickness of the layer of fluid spread between the sheets. Trailing end section 26 extends beyond the trailing edge of second sheet 14 and is adapted to cooperate with either the trailing end of the photosensitive sheet or, in the alternative embodiment, with the trailing end of first carrier sheet 16, for collecting excess processing fluid.

The end of tapered leading end section 22 is secured to first carrier sheet 16 intermediate the leading end of the first carrier sheet and the leading edge of photosensitive sheet 12 with the photosensitive layer of the photosensitive sheet and the image-receiving layer of the second sheet in face-to-face relation and with the leading edges of photosensitive and second sheets 12 and 14 substantially in alignment with one another. In the assembled form of the film unit shown, the trailing edge of second carrier sheet 20 should be disposed substantially in alignment with the trailing edge of photosensitive sheet 12. In the alternative embodiment wherein the photosensitive and second sheets are of substantially equal length and first carrier sheet 16 extends behind and beyond the trailing edge of the photosensitive sheet, the trailing edge of second carrier sheet 20 is in substantial alignment with the trailing edge of the first carrier sheet.

A tapered leader sheet 30, substantially coextensive with tapered leading end section 22 of carrier sheet 20, is provided secured at its trailing end to the leading edge of second sheet 14 at the surface thereof opposite carrier sheet 20, and at its leading edge to carrier sheet 16 at approximately the same location as is the leading edge of leading end section 22. Leader sheet 30 is provided with a tapered tear-out portion designated 32 and defined by a series of die cut lines 34 which extend from an aperture 36 in leader sheet 30 intermediate its ends and sides. Die cut lines 34 extend from aperture 36 outwardly toward the margins of leader sheet 30 where the latter is attached to second sheet 14. Tear-out section 32 provides means whereby, following processing of the photosensitive and image-receiving sheets, the image-receiving sheet may be separated from the photosensitive sheet and second carrier sheet 20. This is accomplished, for example, by inserting a fingernail into aperture 36 so as to grasp the narrowest portion of tear-out section 32 and tearing the latter along die cut lines 34 toward the leading edge of second sheet 14, and then employing the tear-out portion for peeling the second sheet away from carrier sheet 20 and photosensitive sheet 12. The bond between the tear-out portion of leader sheet 30 and the leading edge of the image-receiving sheet will, of course, be stronger than the bond between the image-receiving sheet and second carrier sheet 20 in order for stripping to occur.

Figure 2:
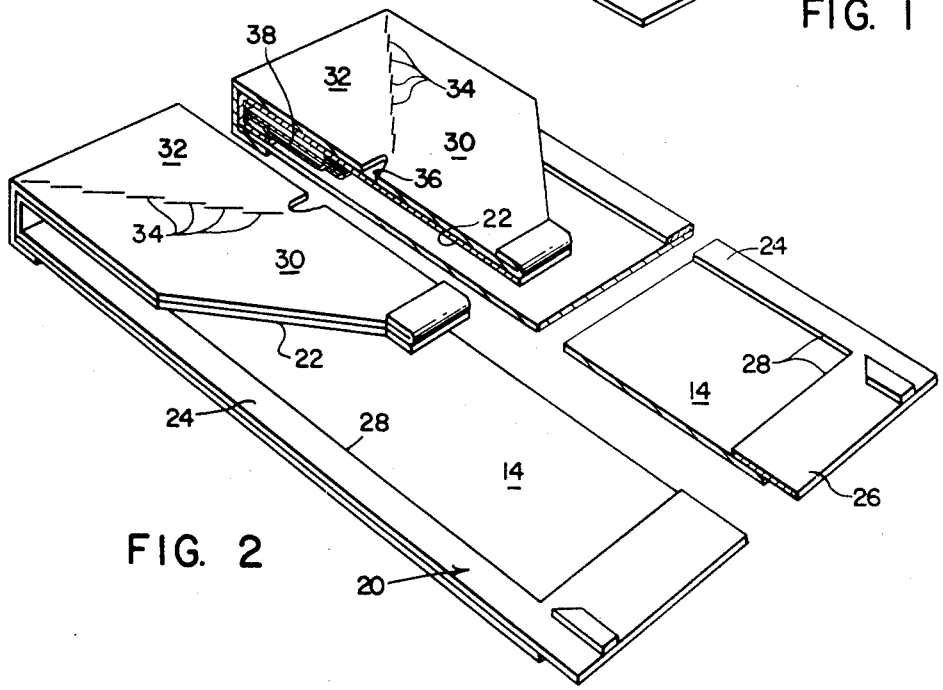
Fig. 2 is a view similar to Fig. 1 with a part of the film unit removed.
Figure 5:
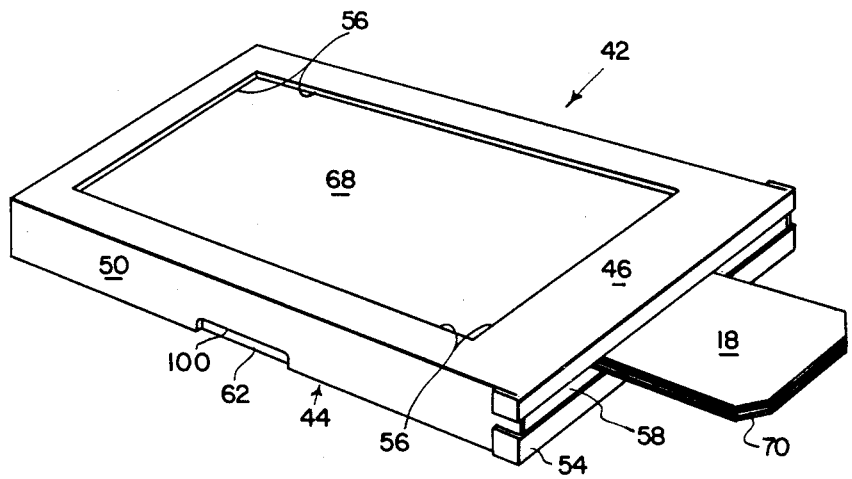
Figs. 5 and 6 are front and rear perspective views, respectively, of the assemblage of film units shown in Fig. 3.
Figure 6:
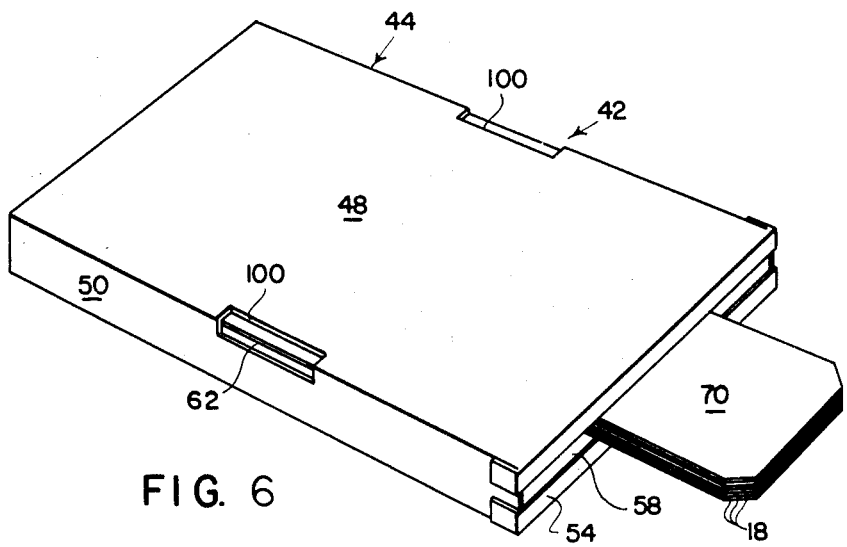

The photosensitive and second sheets are adapted to be processed by a fluid composition carried in a rupturable container 38 mounted on either of carrier sheets 16 and 20 adjacent the leading edge of the photosensitive or second sheet which is secured to the particular carrier sheet. Container 38 is formed substantially as shown in the above-mentioned U.S. Patent No. 2,543,181 and comprises a rectangular blank of fluid- and vapor-impervious sheet material, folded longitudinally upon itself to provide two walls which are bonded together at their margins to form an elongated cavity for the processing fluid. The longitudinal seal is weaker than the shorter end seals and is adapted to become unsealed in response to hydraulic pressure generated within the fluid contents of the container by the application of compressive pressure to the container. Container 38, in the form shown in Fig. 1, is mounted on first carrier sheet 16 intermediate the leading edge of photosensitive sheet 12 and the point at which the second carrier sheet is secured to the first carrier sheet. The container extends substantially from side to side of the carrier sheet and the fluid cavity of the container is preferably at least as wide as aperture 28 in the intermediate section of the second carrier sheet. The longitudinal edge of the container which is adapted to become unsealed is located facing the photosensitive sheet and closest the leading edge thereof. In an alternative form of film unit, container 38 is mounted on leading end section 22 of second carrier sheet 20 adjacent the leading edge of second sheet 14. Container 38, as shown in Fig. 2, is secured to carrier sheet 20 with the longitudinal edge of the container, which is adapted to become unsealed, located nearest the second sheet by a hinge strip 40 secured at the opposite longitudinal edge of the container.

Film unit 10, when assembled in position for exposure, is disposed with carrier sheet 16 folded adjacent the leading edge of photosensitive sheet 12 so that the photosensitive sheet faces away from the image-receiving sheet in the same direction as the latter. In this position of the film unit, first carrier sheet 16 extends between the photosensitive and image-receiving sheets toward the leading end of the image-receiving sheet and the trailing end of the photosensitive sheet. Leading end section 22 of second carrier sheet 20 is folded inwardly between the photosensitive and image-receiving sheets toward the leading end of the image-receiving sheet and the leading end of the photosensitive sheet so that leading end section 22, leader sheet 30 and container 38 are disposed between the photosensitive and second sheets which are located to the outside of the film unit. Leader portion 18 of first carrier sheet 16 projects from between the leading end of the image-receiving sheet and the trailing end of the photosensitive sheet to provide means for manipulating the film unit so as to position the photosensitive and image-receiving sheets in superposed, aligned relation.

A plurality of film units 10 may be assembled in the form of a film pack designated 42 and shown in Figs. 3 through 6 of the drawings. Film pack 42 comprises means in the form of a generally parallelpiped shaped box or container 44 for enclosing the film units. Container 44 is adapted to fabrication from thin sheet material such as stiff paper, cardboard, sheet metal, plastic and the like, and comprises a rectangular forward wall 46 and a rear wall 48, joined by side walls 50, a trailing end wall 52 and a leading end wall 54. A rectangular exposure aperture 56 is provided in forward wall 46 for exposing the photosensitive sheets of film units positioned within container 44 and leading end wall 54 is provided with a slot 58 intermediate the forward and rear walls for withdrawing film units from the container.

Mounted within container 44 is a substantially flat and rigid pressure plate 60 having dependent flanges 62. Pressure plate 60 is so dimensioned and disposed within the container as to extend substantially from end to end thereof with flanges 62 located closely adjacent the side walls of the container and extending rearwardly so as to abut against rear wall 48.

Each film unit 10 of the film pack is disposed within container 44 with the photosensitive sheet of the film unit located forward of pressure plate 60 between the latter and forward wall 46. The first carrier sheet 16 of each film unit is bent around the trailing end of the pressure plate, and the second sheet 14, first carrier sheet 16, second carrier sheet 20 and container 38 are disposed behind the pressure plate between the latter and rear wall 48. Each of the plurality of film units 10 provided in box 44 is arranged in the same manner, with the photosensitive sheets disposed in one stack forward of the pressure plate and the second sheets disposed in another stack to the rear of the pressure plate. The photosensitive sheets in this position extend across aperture 56 in position to be exposed through the aperture and the second sheets are loosely contained to the rear of the pressure plate between flanges 62.

Means are provided for preventing light from entering aperture 56 and/or 58 and exposing the photosensitive sheets. In the form shown in Figs. 3 and 4, this means comprises an envelope 64 secured around the stack of photosensitive sheets 12 within box 44. Envelope 64 is provided with an aperture 66 in its forward wall which is substantially coextensive with aperture 56 in forward wall 46 whereby the photosensitive sheets positioned within the envelope may be exposed. A pair of cover sheets 68 are provided located in superposed relation across aperture 56 and aperture 66 between forward wall 46 of box 44 and the forward wall of envelope 64. Envelope 64 and cover sheets 68 are formed of a light-opaque material, for example black paper, plastic and the like, and two cover sheets are provided in superposition in order to preclude any chance of exposure of the foremost photosensitive sheet due to minute holes in the cover sheets. Leader 70 is connected to the leading ends of the cover sheets at a location near the trailing end of the film pack and extends around the trailing end of the pressure plate between the second sheets and rear wall 48 of box 44 and thence through slot 58 at the leading end of the box. While there is little or no possibility of light entering slot 58, exposing the photosensitive sheets, this is positively precluded by the arrangement of envelope 64 and cover sheets 68 whose primary function is to cooperate with forward wall 46 to provide a lighttight baffle sealing exposure aperture 56 against the admission of light.

The film pack of the invention is adapted to be employed in a camera or other lighttight apparatus having an opening through which leaders 18, and the film units which said leaders comprise, may be withdrawn from the apparatus. When a film pack has been positioned in the apparatus, cover sheets 68 are withdrawn from the pack by drawing on leader 70 which projects through slot 58 in leading end wall 54. The cover sheets are thus drawn around the trailing end of pressure plate 60 behind the latter and from container 44, thereby leaving aperture 56 uncovered and permitting exposure of the photosensitive sheets. Following exposure of the foremost photosensitive sheet 12 located adjacent forward wall 46, the leader portion 18 and first carrier sheet 16 comprising the same film unit as the exposed photosensitive sheet, are drawn through slot 58 from container 44. As first carrier sheet 16 moves through slot 58, the photosensitive sheet 12 connected thereto is drawn around the trailing end of the pressure plate behind the pressure plate into superposed registered relation with the second sheet 14 comprising the film unit. In the form of film pack shown in Fig. 3, as the photosensitive sheet is being moved into registration with the second sheet 14, container 38 mounted on first carrier sheet 16 is moved toward the leading end of the second sheet, and second carrier sheet 20 and leader sheet 30 are caused to roll progressively from the leading end thereof toward their trailing ends while the second sheet 14 remains substantially motionless within container 44.

Rolling of second carrier sheet 20 and leader sheet 30 should start along a transverse line at the leading ends of the sheets in the region of their attachment to first carrier sheet 16, necessitating that the second carrier sheet 20 and leader sheet 30 have a tendency to "break" or fold and roll more readily at this location. It is for this reason that the second carrier sheet and leader sheet are tapered so as to provide the least resistance to folding or breaking at their narrowest portions which occur at their point of attachment to the first carrier sheet.

While the foremost photosensitive sheet 12 is being drawn around the trailing end of the pressure plate into superposed and registered relation with the second sheet 14 comprising the same film unit, the second sheet and the remaining photosensitive sheets are required to be held substantially stationary with respect to the pressure plate and container 44. Accordingly, means are provided for holding the rearmost second sheet 14 substantially stationary with respect to container 44 while the photosensitive sheet 12, comprising the same film unit, is moved into superposition with the second sheet between the latter and rear wall 48 of the container. This last-mentioned means comprises a portion of pressure plate 60 at the leading edge thereof folded rearwardly and thence toward the pressure plate to provide a rearwardly projecting ramp 88 at the leading end of the pressure plate for displacing the leading end of the rearmost second sheet 14 to the rear of slot 58 so that the leading end of the second sheet is out of alignment with slot 58 and is engaged by leading end wall 54 for preventing movement of the second sheet during movement of first carrier sheet 16 and the foremost photosensitive sheet 12. When second carrier sheet 20 and leader sheet 30 have been completely unrolled and withdrawn through aperture 58, continued withdrawal of the second carrier sheet and leader sheet is effective to bend the leading end of the carrier sheet sufficiently to move the latter, in superposition with the photosensitive sheet comprising the same film unit, through slot 58 from container 44.

Means are provided on pressure plate 60 at the trailing end thereof for cooperating with the photosensitive sheets to prevent movement of the photosensitive sheets during withdrawal of the foremost photosensitive sheet from the film pack. This last-mentioned means comprises providing a corner 90 having an abrupt edge located at the trailing end of pressure plate 60 in alignment with the leading edges of photosensitive sheets 12. The trailing end section 92 of pressure plate 60 is shaped so as to guide first carrier sheet 16 rearwardly and causing it to bend at the leading edge of the photosensitive sheet 12 to which it is attached. Trailing end section 92 of pressure plate 60 is curved at its rearmost portion to facilitate movement of the photosensitive sheets around the trailing end of the pressure plate. The configuration of trailing end section 92 and corner 90 is such that tension on outermost carrier sheet 16 causes all the photosensitive sheets to be drawn against pressure plate 60 at corner 90, necessitating that the photosensitive sheets bend at this corner in order to move around the corner. The photosensitive sheets, because of their inherent stiffness, provide sufficient resistance to such bending to preclude any movement of the photosensitive sheets due to friction with the foremost photosensitive sheet as the latter is being moved. Because the foremost or outermost photosensitive sheet is not compressed against the pressure plate at corner 90 by any other photosensitive sheet or carrier sheet 16 and is more remote from corner 90, it does not have to bend so sharply, with the result that it is free to bend more easily so as to move around the corner when drawn around the corner by first carrier sheet 16 attached to the foremost photosensitive sheet.

Figure 7:
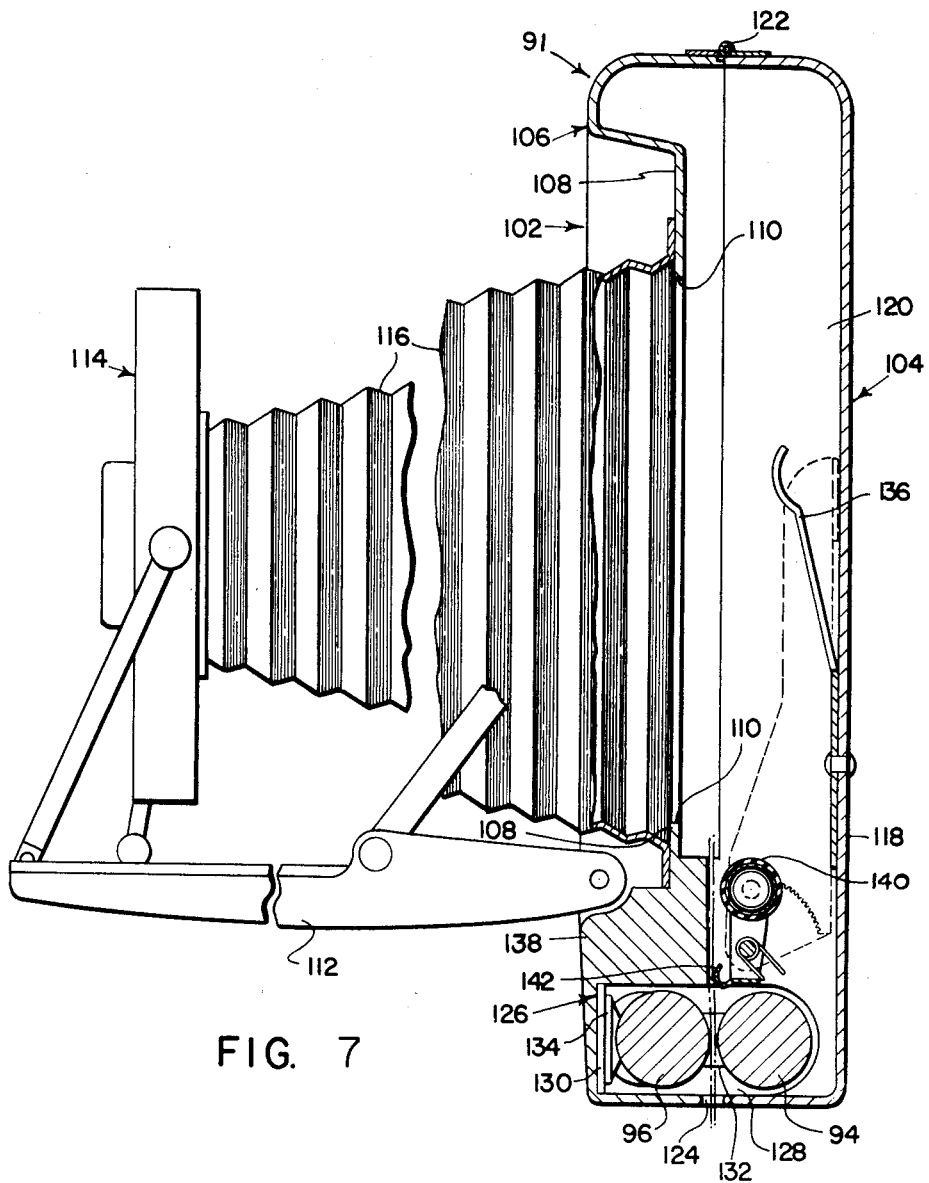
Fig. 7 is a fragmentary perspective view of a camera embodying the invention.

The film pack is adapted to be employed in photographic apparatus such as the camera shown in Fig. 7 of the drawings, and which includes means for spreading the fluid contents of the container of each film unit between the photosensitive and second sheets of the film unit. This fluid-spreading means comprises a pair of juxtaposed members between which the photosensitive and second sheets are moved in superposition for spreading the fluid and may be biased toward one another or may be spaced a fixed distance apart so as to provide a fixed gap through which the sheets are moved. The juxtaposed members in the form shown comprise a pair of cylindrical pressure-applying rolls 94 and 96 adapted to apply compressive pressure to the sheets. Other forms of pressure-applying members suitable for use in the apparatus of the invention include bars, a slot in a plate, a plate and roll, and the like.

Rolls 94 and 96 are mounted for rotation with their axes in a plane and substantially parallel, and are biased toward one another so as to apply compressive pressure to a film unit as the film unit is moved between the rolls from the camera. The fluid to be spread between the photosensitive and second sheets is quite viscous and is provided between the sheets so that the the sheets are moved between the rolls, the fluid is caused to be spread in a thin layer, the thickness of which is a function of the compressive pressure applied by the rolls and of intermediate section 24 of second carrier sheet 20 located between sheets 12 and 14 during fluid spreading. Intermediate section 24 functions as a mask for spacing apart the rolls and for defining the areas of the photosensitive and second sheets in which processing occurs by limiting the area of contact between the fluid and second sheet 14 to the region within aperture 28 in intermediate section 24.

As the sheets with the fluid container therebetween are moved between the pressure-applying rolls, the fluid contents of container 38 are ejected from the container and are advanced relative to and between the photosensitive and second sheets along a front which is generally curved or tongue-shaped. In order to insure a complete spread of the fluid in a layer of the desired thickness over a predetermined area which is preferably coextensive with aperture 28, the fluid is usually provided in the container in an amount greater than the minimum required for the desired layer, and this necessity for an excess amount of fluid is only increased by the fact that the fluid is spread along a tongue-shaped front which may cause a tendency, especially in the case of rectangular areas, to leave portions of the area within aperture 28 uncovered, particularly at the lateral edges. Although the amount of excess fluid can be appreciably reduced if provision is made for causing the fluid, as it was being spread between the sheets, to advance along a front which is approximately straight, is perpendicular to the direction of advance, and is substantially equal in length to the width of the area over which spreading was supposed to occur, it is still desirable to provide some excess fluid in order to make certain of a complete spread over the desired area. This necessitates the provision of means for collecting any excess fluid which may be spread beyond the end of the desired area to prevent the same from being squeezed from the trailing end of the film unit. This last-mentioned means for collecting and retaining excess fluid comprises trailing end section 26 of second carrier sheet 20 and the corresponding trailing end section of photosensitive sheet 12. In the alternative embodiment previously described wherein first carrier sheet 16 extends behind and beyond the trailing end of the photosensitive sheet, the trailing end portion of the first carrier sheet cooperates with trailing end section 26 to provide the means for trapping and retaining excess processing fluid. Provision is made for spacing apart the trailing end sections of the sheets comprising the fluid-collecting means as these trailing end sections are moved between the pressure-applying rolls so as to provide a space between the trailing end sections in which excess fluid is collected. This last-mentioned means in the form shown comprises a pair of spacing elements 98 mounted on trailing end section 26 adjacent the margins thereof. Where the film unit is to be used with pressure-applying members of the type which are spaced a fixed minimum distance apart, which distance is greater than the combined thickness of the two trailing end sections comprising the fluid-collecting means, spacing members 98 may be unnecessary.

Pressure plate 60 is provided in the film pack for supporting photosensitive sheets 12 in position for exposure against forward wall 46 across aperture 56. Resilient means are provided in the camera for biasing the pressure plate toward forward wall 46 and, for this purpose, openings 100 are provided in the rear of the film pack at the intersection of each of side walls 50 and rear wall 48. Openings 100 permit resilient members in the camera to engage flanges 62 on pressure plate 60 for biasing the pressure plate toward the front of the film pack.

Reference is now made to Fig. 7 of the drawings wherein there is illustrated a camera 91, including means for holding film pack 42 and means for feeding individual film units from the pack between the fluid-spreading members and from the camera so that each film unit may be withdrawn from the camera between the fluid-spreading members to effect the processing of the film unit. Camera 91 comprises a forward housing section 102 and a rear housing section 104. Forward housing section 102 includes a forward wall 106 having a recessed or reentrant section 108 including an aperture 110 through which exposure of the photosensitive sheets within the camera can be effected. A hinged door 112 is provided for covering recessed section 108 and mounting a conventional lens and shutters assembly 114, the latter being connected to recessed section 108 by a collapsible bellows 116 secured at one end to the lens and shutter assembly and secured at its other end to the recessed section around aperture 110. In lieu of door 112, lens and shutter assembly 114 and bellows 116, the forward and rear housing sections of a camera could be constructed in the form of a camera back or a film pack adapted intended to be mounted on or coupled with the rear of a camera. Rear housing section 104 includes a rear wall 118 and side walls 119, and cooperates with forward housing section 102 to provide a chamber 120 behind aperture 110 for containing a film pack, such as previously described, in position for exposure across aperture 110. The film pack is mounted in chamber 120 with the forward wall of the pack located against the rear surface of reentrant section 108 and with the aperture in the forward wall of the pack aligned with aperture 110. Rear housing section 104 is preferably pivotally secured to forward housing section 102 adjacent one end of the housing herein shown and designated for purposes of description as the upper end by a hinge 122, thereby permitting the separation of the two housing sections for loading of a film pack into chamber 120. An opening 124 is provided at the lower end of the camera housing intermediate the forward and rear housing sections to permit withdrawal of a film unit from the housing. Suitable means (not shown) of a conventional type are also provided in the lower end of the housing for retaining the two housing sections together in the closed or operative position shown in the drawings.

Camera 91 includes a pair of pressure-applying rolls 94 and 96 mounted within chamber 120, adjacent opening 124 in the lower end of the chamber. Pressure-applying rolls 94 and 96 are mounted for pivotal movement with their axes in a common plane on such means as a generally U-shaped support member 126 having a pair of rearwardly projecting arms 128 joined by a transverse connecting element 130. Each of arms 128 is provided with a slot 132 which may be generally key-shaped, and each of rolls 94 and 96 is provided with stub shafts at its ends rotatably journaled in bushings engaged in slots 132. A spring 134 is mounted intermediate its ends on connecting element 130 between the latter and roll 96 with its ends in engagement with the bushings in which the roll is journaled for urging roll 96 toward roll 94.

As previously noted, one method of trapping excess processing fluid is to provide a pair of pressure-applying members so constructed that there is always a minimum fixed gap between the members. This may be accomplished with rolls 94 and 96 by mounting and constructing the bushings so that they engage one another and retain the rolls spaced apart from one another by a fixed minimum distance. This fixed minimum gap between the rolls may have a depth which is substantially greater than the combined thickness of the trailing end sections of the sheets providing the fluid-trapping means, but which does not exceed the combined thicknesses of the photosensitive and second sheets and the layer of fluid to be spread therebetween.

As a means for biasing the pressure plate of a film pack toward the front of the camera, a pair of cantilever springs 136 are provided mounted on rear wall 118 within chamber 120 with their free ends extending forwardly so as to extend into openings 100 in the rear of the film pack for engaging flanges 62 on pressure plate 60.

The film pack is mounted within the camera with leader portions 18 and 70 located within the camera on the inside of pressure-applying rolls 94 and 96. The camera accordingly includes means for advancing leader portions 18 and 70, one at a time, between the pressure-applying rolls from the camera through opening 124 in the lower end of the camera housing so that the leaders may be grasped for first withdrawing cover sheets 68 and then film units 10 from the camera between the pressure-applying rolls. In order to maintain the overall size of the camera as small as possible, the spacing between the pressure-applying rolls and the lower or leading end of the film pack is kept to a minimum and is therefore substantially less than the distance each leader is moved when advanced between the pressure-applying rolls from the camera through opening 124. Accordingly, the means which engage the leaders at a position between the pressure-applying rolls and the film pack, and are movable in engagement with the leaders for advancing them, are limited in their movement to a distance which is substantially less than the distance the leaders are moved.

The leader-advancing means are manually operable from the exterior of the camera and preferably take a number of forms, such as a roll or rolls having friction-generating surface portions formed, for example, of rubber or the like, adapted to engage the leaders. The rolls are urged into engagement with the leaders and simultaneously rotated and displaced downward toward the pressure-applying rolls. The leader-advancing rolls are mounted adjacent rear wall 118 between the lower or leading end of the film pack and pressure-applying rolls 94 and 96, and are adapted to be displaced toward the front of the camera for engaging and advancing the leaders. A backing member 138, having a substantially plane rear surface extending toward the pressure-applying rolls, is provided on the forward housing section between aperture 110 and the pressure-applying rolls to provide means against which the leader-advancing rolls may act for engaging and advancing the leaders toward the pressure-applying rolls. Leader-advancing means of this type are shown and described in detail in copending U.S. application Serial No. 749,024, filed July 16, 1958, in the name of Vaito K. Eloranta.

The leader-advancing means may take the form of a single roll mounted, on rear housing section 104, for movement toward and away from backing member 138 and for rotation, and biased toward the backing member. The means for rotating the roll may comprise a shaft, including some type of universal coupling, extending from the camera housing to permit manual rotation of the leader-advancing roll.

In the preferred form of camera, shown in Fig. 7 of the drawings, the leader-advancing means is adapted to perform a second function, namely distributing the fluid as it is being spread between the photosensitive and second elements of a film unit 10, so that the fluid is advanced between the two elements more uniformly. Fluid-distributing and spreading mechanisms of this type are shown and described in detail in copending U.S. application Serial No. 757,976, filed August 29, 1958, in the name of Vaito K. Eloranta, and are adapted to advance the rearmost leader toward and between the pressure-applying rolls so that the leader may be grasped for drawing the film unit associated therewith between the pressure-applying rolls. As the film unit is being moved between the two pressure-applying rolls for spreading the processing fluid between the sheets of the film unit toward the trailing ends, the leader-advancing means engages and applies compressive pressure to the film unit at a position spaced from the pressure-applying rolls in the direction of the trailing end of a film unit for restricting the spread of the fluid between the sheets comprising the film unit. This restriction of the spreading of the fluid is in the direction of the sides of the film unit, so that the fluid is distributed outwardly and caused to be spread along a front which more closely approximates a line perpendicular to the direction of spreading, rather than along the tongue-shaped front which might otherwise be the case.

An improved form of leader-advancing and fluid-distributing mechanism is illustrated in Figs. 7 through 10 of the drawings and comprises separate elements for advancing the leaders between the pressure-applying rolls and distributing the processing fluid as it is being spread by the pressure-applying rolls between the sheets of a film unit. Such a leader-advancing and fluid-distributing device offers a number of advantages over devices comprising a single element or set of elements which perform both of the functions; for example, the advancement of the rearmost leader depends on the friction between the leader-engaging element and the leader, thus requiring that the leader-advancing element press all the leaders against backing member 138 and themselves, thereby causing a tendency for all of the leaders to be advanced due to friction between adjacent leaders. This tendency to advance adjacent leaders is continued as each film unit is being withdrawn between the pressure-applying rolls if the leader-advancing member is biased toward backing member 138 into engagement with the film unit so as to press the film unit against leaders lying across the rear surface of the backing member. This, of course, is what happens when the leader-advancing member is required to perform the added fluid-distributing function wherein it cooperates with the backing member to apply compressive pressure to the film units. A solution to this problem is to provide a separate element adapted to cooperate with the backing member for applying compressive pressure to film units as they are moved between pressure-applying rolls, and so located with respect to the backing member and leaders as not to apply compressive pressure to the moving film unit through the leaders.

The device of the invention includes, in addition to both a leader-advancing member and a fluid-distributing member, means for biasing the leader-advancing member into engagement with a leader while displacing the fluid-distributing member out of the path of the leader during movement of the leader toward and between the pressure-applying rolls, and means for biasing the fluid-distributing member toward backing means 138 into engagement with a film unit while displacing the leader-advancing member out of engagement with the film unit and leaders during withdrawal movement of the film unit between and in engagement with the pressure-applying rolls and the backing and fluid-distributing members. By virtue of this construction the functions of the leader-advancing and fluid-distributing members are performed independently of one another while each member is automatically withdrawn from engagement with the film unit or leader thereof when not in operation.

The leader-advancing and fluid-distributing device of the invention comprises leader-advancing roll 140 and a curved fluid-distributing bar 142, both mounted within the camera housing adjacent the rear surface of the backing member 138 on a U-shaped support 144 so as to extend transversely of the direction of movement of the film units. Support 144 comprises a pair of arms 146 and a transverse connecting member 148, bar 142 preferably comprising an integral portion of member 148. Support 144 is mounted for limited pivotal movement on a shaft 150 projecting through arms 146 intermediate their ends, and supported at its ends on side walls 119 of rear housing section 104. A torsion spring 152 is provided coiled around shaft 150 in engagement with one of arms 146 and rear wall 118 for biasing support 144 in a clockwise direction (viewing Figs. 7 and 10), so as to urge bar 142 forwardly against backing member 138 adjacent pressure-applying rolls 94 and 96. It should be noted that leaders 18 and 70 extend from the film pack downward across the rear surface of support member 138 to a location just short of bar 142 so that the bar, adapted to distribute processing fluid within a film unit, does apply compressive pressure to or through the leaders.

Leader-advancing roll 140 in the form shown comprises a generally cylindrical member 154, provided with a covering 155 comprising a friction-generating material such as a relatively soft rubber or the like. One end of cylindrical member 154 is mounted for rotation on a stud 156, secured against rotation in one of arms 146 adjacent the end of said one arm opposite bar 142. Stud 156 includes an enlarged portion which extends within cylindrical member 154, and to which is secured one end of a coiled torsion spring 158. Spring 158 is contained within cylindrical member 154 and extends toward the opposite end of cylindrical member 154 which is mounted for rotation about a bearing member 159 mounted on a shaft 160 journaled in the other of arms 146 and extends beyond the arm through a slot 162 in a side wall 119 of the rear housing section.

A ratchet wheel 164 is provided on the inner end of shaft 160 within cylindrical member 154, adapted to be engaged by a detent 165 within member 154 whereby rotation of the shaft and ratchet wheel in a counterclockwise direction (viewing Figs. 7 and 10) will be imparted to the cylindrical member. This arrangement permits the shaft to rotate freely in a clockwise direction with respect to the cylindrical member. The end of coiled torsion spring 158 opposite stud 156 is connected with shaft 160 so that the torsion spring will be tensioned when shaft 160 is rotated in a counterclockwise direction.

Means are provided for rotating shaft 160 in a counterclockwise direction for advancing a leader toward pressure-applying rolls 94 and 96. This last-mentioned means comprises a gear 166 keyed to the outer end of shaft 160 exterior of side wall 119 and an annular gear 168 meshed with gear 166 and mounted for rotation about the same axis as shaft 150. Secured to annular gear 168 is a crank 170 for rotating the annular gear in a counterclockwise direction so that the latter in turn imparts a counterclockwise rotation to shaft 160 and leader-advancing roll 140. It will be noted that arms 146 are normally biased in a clockwise direction by torsion spring 152 so that the leader-advancing roll is displaced out of engagement with the leaders. In order to advance a leader, roll 140 must be moved into engagement with the leaders as the roll is being rotated. In order to accomplish this, torsion spring 158 is constructed so as to require a greater force to effect deformation than torsion spring 152. Accordingly, because annular gear 168 pivots about the same center as U-shaped support 144 and engages the portion of gear 166 which is furthest from this center, rotation of annular gear 168 in a counterclockwise direction causes the rotation of the U-shaped support in a counterclockwise direction and movement of the leader-advancing roll into engagement with the leaders supported on backing member 138. The pressure with which leader-advancing roll 140 engages the leaders is a function of the difference in torque required to deform torsion springs 152 and 158. The ratio between gears 166 and 168 may be such as to require the pivotal movement of crank 170 through a relatively small portion of a revolution in order to rotate the leader-advancing roll sufficiently to advance a leader between pressure-applying rolls from the camera housing. When the leader has been so advanced, the crank may then be released so as to return to its original position under the bias of torsion spring 158. Release of the crank also permits support 144 to pivot in a clockwise direction under the bias of torsion spring 152 so as to disengage the leader-advancing roll from the leader and move fluid-distributing bar 142 into engagement with a portion of the film unit comprising the leader just advanced. The ratchet wheel 164 and detent 165 permit return movement of crank 170 to its original position of rest without rotation of leader-advancing roll 140.

Figure 11:
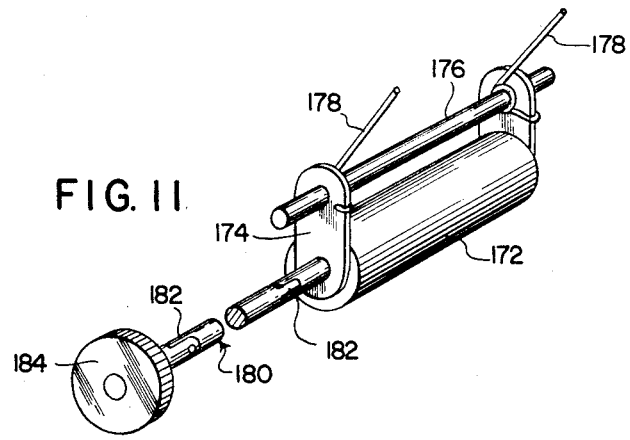
Fig. 11 is a fragmentary sectional view of another form of a device embodying the invention and adapted to be incorporated in the camera of Fig. 7.
Figure 8:
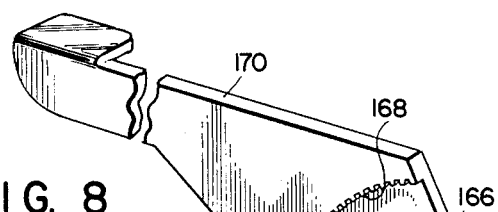
Fig. 8 is a fragmentary perspective view of a device comprising the camera of Fig. 7 and embodying the invention.
Figure 9:
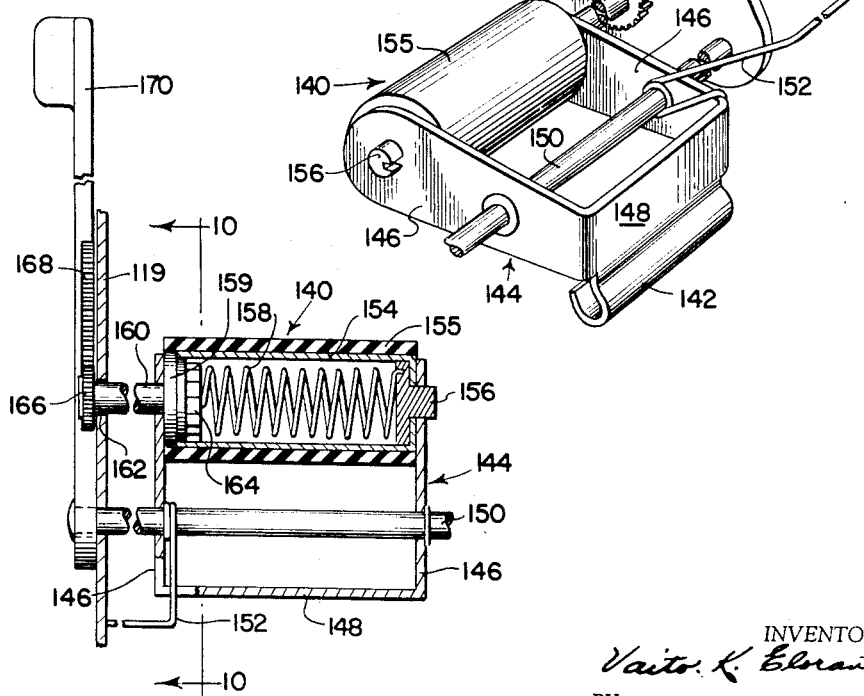
Fig. 9 is a fragmentary sectional view of the device shown in Fig. 8.

Another form of leader-advancing and fluid-spreading and distributing device is shown in Fig. 11 of the drawings and comprises a single roll 172 adapted to perform the functions of a leader-advancing, fluid-spreading and fluid-distributing device. Roll 172 is mounted for rotation adjacent the ends of a pair of arms 174, in turn mounted for pivotal movement about their opposite ends on a shaft 176 secured in side walls 119 of the camera housing. Arms 176 extend forwardly and downwardly toward backing member 138 and are pivotable in a clockwise direction for moving roll 172 toward the backing member.

The pressure which roll 172 is required to apply to a film unit for distributing the processing fluid is less than the pressure which must be exerted to insure sufficient friction between roll 172 and a leader for advancing the leader and the pressure required for fluid spreading. The pressure for distributing and spreading the fluid is provided by a pair of torsion springs 178 each coiled around shaft 176 and engaged at one end on an arm 174 and at its other end against rear housing wall 118 for imparting a clockwise bias to the arms. In order to advance a leader, roll 172 is rotated in a counterclockwise direction, which rotation tends to cause a further rotation of the arms in a clockwise direction, thereby increasing the pressure exerted by the roll on the leaders. As a means for rotating roll 172 in a counterclockwise direction, there is provided a shaft 180 attached to the roll and extending through an opening in a side wall 119 in the camera housing. Shaft 180 is formed in three sections pivotally connected to one another at 182 so as to form a universal coupling between the section of shaft 180 on which the roll is mounted and the outer section of shaft 180 which projects from the housing. A knob 184 may be provided on this last-mentioned end section of shaft 180 to permit manual rotation of the shaft.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic apparatus for treating a photographic film assemblage with a fluid composition, said apparatus comprising, in combination, means defining a path along which said assemblage is moved, first means mounted in the path of movement of said film assemblage for engaging said assemblage and spreading a fluid in a layer between superposed layers of assemblage, second means mounted in said path adjacent said first means for frictionally engaging at least a portion of said film assemblage for advancing said portion along said path into engagement with said first means and for applying compressive pressure to said film assemblage during subsequent movement thereof in engagement with said first means, and means for biasing said second means into engagement with said film assemblage with greater force during advancement of said portion of said film assemblage into engagement with said first means than during subsequent movement of said film assemblage in engagement with said first means.

2. Photographic apparatus for exposing and thereafter treating the photosensitive layer of a film assemblage with a fluid processing composition, said apparatus comprising, in combination, means for housing and positioning said assemblage for exposure, means for exposing said photosensitive layer, means defining a path along which said assemblage is moved, first means mounted in the path of movement of said film assemblage for engaging said assemblage and spreading a fluid in a layer between superposed layers of said assemblage, second means mounted in said path adjacent said first means for frictionally engaging at least a portion of said film assemblage for advancing said portion along said path into engagement with said first means and for applying compressive pressure to said film assemblage during subsequent movement thereof in engagement with said first means, and means for biasing said second means into engagement with said film assemblage with greater force during advancement of said portion of said film assemblage into engagement with said first means than during subsequent movement of said film assemblage in engagement with said first means.

3. Photographic apparatus for exposing and thereafter treating with a fluid the photosensitive layer of each of a plurality of film assemblages, said apparatus comprising, in combination, means for housing said film assemblages and positioning said assemblages for exposure with at least a portion of each of said assemblages arranged in overlying relation with portions of other assemblages, means for exposing the photosensitive layer of each of said assemblages, means defining a path along which said assemblages are moved, first means mounted in the path of movement of said assemblages for engaging said assemblages and spreading a fluid in a layer between said photosensitive layer and another layer of each assemblage, second means mounted in said path adjacent said first means for frictionally engaging one of said portions of said assemblages for advancing said portion along said path into engagement with said first means and for applying compressive pressure to the assemblage comprising said one portion during subsequent movement of the last-mentioned assemblage in engagement with said first means, and means for biasing said second means into engagement with said last-mentioned assemblage with greater force during advancement of said one portion into engagement with said first means than during subsequent movement of said last-mentioned assemblage in engagement with said first means.

4. Photographic apparatus for treating a photographic film assemblage with a fluid processing composition, said apparatus comprising, in combination, means providing a path along which said film assemblage is movable through said apparatus, first means positioned in the path of movement of said film assemblage for engaging said film assemblage and spreading said processing fluid in a layer between layers of said film assemblage during movement of said film assemblage in engagement with said first means, pressure-applying means mounted in said path of movement of said film assemblage for applying compressive pressure to at least a portion of said film assemblage for distributing said fluid during the spreading thereof by said first means, said pressure-applying means being movable for frictionally engaging and advancing at least a portion of said assemblage into engagement with said first means, and means for causing said pressure-applying means to apply greater compressive pressure to said assemblage during advancement of said assemblage into engagement with said first means than during subsequent movement of said assemblage in engagement with said first means for spreading said fluid.

5. Photographic apparatus for exposing and thereafter treating with a fluid the photosensitive layer of each of a plurality of film assemblages, said apparatus comprising, in combination, means for enclosing and positioning said assemblages for exposure with at least a portion of each of said assemblages arranged in overlying relation with a portion of other assemblages, means for exposing the photosensitive layer of each of said assemblages, means providing a path along which said assemblages are movable through said apparatus, first means positioned in the path of movement of said assemblages for engaging each of said assemblages and spreading said processing fluid in a layer between the photosensitive layer and another layer of each said assemblage during movement of said assemblage in engagement with said first means, pressure-applying means mounted in said path of movement of said assemblages for applying compressive pressure to each of said assemblages for distributing said fluid within said assemblage during spreading of said fluid by said first means, said pressure-applying means being movable for frictionally engaging and advancing at least said portion of one of said assemblages into engagement with said first means, and means for causing said pressure-applying means to apply greater compressive pressure to the assemblage comprising said one portion during advancement of the last-mentioned assemblage into engagement with said first means than during subsequent movement of said last-mentioned assemblage in engagement with said first means for spreading said fluid.

6. Photographic apparatus for treating a photographic film assemblage with a fluid processing composition, said apparatus comprising, in combination, fluid-spreading means for engaging said film assemblage and spreading said fluid in a layer between layers of said assemblage during movement of said assemblage through said apparatus in engagement with said spreading means, guide means mounted within said apparatus adjacent said spreading means for supporting at least a portion of said assemblage and guiding said portion into engagement with said spreading means, pressure-applying means mounted adjacent said spreading means for movement relative to said guide means, means for biasing said pressure-applying means toward said guide means into frictional engagement with at least said portion of said assemblage supported on said guide means, and operating means for so moving said pressure-applying means in frictional engagement with said portion as to advance said portion into engagement with said spreading means, said operating means including means for causing said pressure-applying means to apply greater compressive pressure to said one portion as said pressure-applying means is moved for advancing said portion into engagement with said spreading means than during subsequent movement of said film assemblage between said pressure-applying means and said guide means and in engagement with said spreading means.

7. The photographic apparatus of claim 6 wherein said pressure-applying means comprises a pair of members and means mounting said members for movement toward and away from said guide means, said operating means includes means for urging one of said members toward said guide means into frictional engagement with said portion supported thereon while simultaneously moving said one member in frictional engagement with said portion so as to advance said portion into engagement with said spreading means and displace the other of said members, located intermediate said one member and said spreading means, away from said guide means, and means are provided for urging said other member toward said guide means so as to engage and apply compressive pressure to said assemblage during subsequent movement thereof between said guide means and said members and in engagement with said spreading means and simultaneously urging said one member away from said guide means out of engagement with said assemblage.

8. The photographic apparatus of claim 7 wherein said one member comprises a roll mounted for rotation in frictional engagement with said film assemblage and said operating means includes means for rotating said roll in frictional engagement with said portion for advancing said portion between said other member and said guide means into engagement with said spreading means.

9. The photographic apparatus of claim 7 wherein said means for mounting said members comprises an element mounted intermediate said members for pivotal movement with respect to said guide means whereby pivotal movement of said element is operative for simultaneously moving one of said members toward said guide means and the other of said members away from said guide means, resilient means are provided for so biasing said element as to urge said other member toward said guide means, and said operating means includes means for pivoting said element against the bias of said resilient means for urging said one member toward said guide means into frictional engagement with said portion.

10. The photographic apparatus of claim 9 wherein said one member comprises a roll mounted on said element for rotation with respect to said element, said operating means includes means for rotating said roll for advancing said portion into engagement with said spreading means and means for pivoting said element in the same direction as said roll for moving said roll toward said guide means into frictional engagement with said portion.

11. The photographic apparatus of claim 10 wherein said element includes means for resisting the rotation of said roll.

12. Photographic apparatus for treating a photographic film assemblage with a fluid composition, said apparatus comprising, in combination, means defining a path along which said assemblage is movable through said apparatus, first means mounted in the path of movement of said film assemblage for engaging said assemblage and spreading a fluid in a layer between superposed layers of said assemblage, second means mounted for rotation in said path adjacent said first means, means for rotating said second means in frictional engagement with at least a portion of said film assemblage so as to advance said portion along said path into engagement with said first means, means for causing said second means to apply compressive pressure to said film assemblage, and means for rotating said second means and for causing the latter to apply greater compressive pressure to said film assemblage during advancement of said portion of said film assemblage into engagement with said first means than during subsequent movement of said film assemblage in engagement with said first and second means.

13. Photographic apparatus for treating the photosensitive layer of a photographic film assemblage with a fluid processing composition, said apparatus comprising, in combination, means providing a path along which said film assemblage is movable through said apparatus, first means positioned in the path of movement of said film assemblage for engaging said film assemblage and spreading said processing fluid in a layer between layers of said film assemblage during movement of said film assemblage in engagement with said first means, pressure-applying means mounted in said path of movement of said film assemblage for applying compressive pressure to at least a portion of said film assemblage for distributing said fluid during spreading thereof by said first means, said pressure-applying means including a pair of members between which at least a portion of said assemblage is disposed, at least one of said members being movable with respect to the other of said members, and manually operable means for moving said one member in frictional engagement with said portion of said assemblage so as to advance said portion into engagement with said first means, said manually operable means including means for causing said pressure-applying means to apply greater compressive pressure to said assemblage during advancement of said portion into engagement with said first means than during subsequent movement of said assemblage in engagement with said first means and said pressure-applying means.

14. The photographic apparatus of claim 13 wherein said pressure-applying means comprises said one member and another member movable with respect to a third member and said manually operable means includes means for biasing said other member toward said third member so as to apply compressive pressure to said film assemblage during movement thereof between said other and said third members, and means for biasing said one member toward said third member only during advancement of said portion of said assemblage by said one member into engagement with said first means.

15. The photographic apparatus of claim 14 wherein said one member comprises a roll rotatable in frictional engagement with said portion for advancing said portion into engagement with said first means and said manually operable means includes means for rotating said roll.

16. Photographic apparatus for treating a photographic film assemblage with a fluid processing composition, said apparatus comprising, in combination, means providing a path along which said film assemblage is movable through said apparatus, first means positioned in the path of movement of said film assemblage for engaging said film assemblage and spreading said processing fluid in a layer between layers of said film assemblage during movement of said film assemblage in engagement with said first means, pressure-applying means mounted in said path of movement of said film assemblage for applying compressive pressure to at least a portion of said film assemblage for distributing said fluid during spreading thereof by said first means, said pressure-applying means including a pair of members between which at least a portion of said assemblage is disposed, at least one of said members being movable with respect to the other of said members, means for biasing said one member toward said other member into frictional engagement with said portion of said assemblage, and manually operable means for so moving said one member in frictional engagement with said portion of said assemblage as to advance said portion into engagement with said first means, said manually operable means including means for causing said pressure-applying means to apply greater compressive pressure to said assemblage during advancement of said portion into engagement with said first means than during subsequent movement of said assemblage in engagement with said first means and said pressure-applying means.

17. The photographic apparatus of claim 16 wherein said one member comprises a roll rotatable in frictional engagement with said portion of said film assemblage.

18. The photographic apparatus of claim 17 wherein said roll is rotatable in a predetermined direction for advancing said portion into engagement with said first means, pivotal means are provided for mounting said roll for movement toward and away from the other of said pair of members, said pivotal means being pivotable in the opposite direction for moving said roll toward said other member, and means are provided for biasing said pivotal means in said other direction.

19. The photographic apparatus of claim 18 including means coupled with said pivotal means for resisting the rotation of said roll in said predetermined direction.

20. The photographic apparatus of claim 16 wherein said first means comprises a pair of juxtaposed members for applying compressive pressure to said assemblage as the latter is moved in engagement with and between the last-mentioned members.

21. Photographic apparatus for treating a photographic film assemblage with a fluid composition, said apparatus comprising, in combination, housing means defining a path along which said assemblage is moved, a first pair of pressure-applying members mounted in the path of movement of said assemblage for engaging said assemblage during movement thereof between said members and spreading a fluid in a layer between superposed layers of said assemblage, a second pair of pressure-applying members mounted in said path adjacent said first pair of pressure-applying members for frictionally engaging at least a portion of said film assemblage and for applying compressive pressure to said film assemblage during movement thereof between said pressure-applying members of said first pair to effect the distribution of said processing fluid between said layers of said assemblage during spreading of said fluid, and means for moving at least one of said second pair of pressure-applying members in frictional engagement with said portion of said assemblage for advancing said portion of said assemblage between said first pair of pressure-applying members, the last-mentioned means including means for causing said second pair of members to apply greater compressive pressure to said assemblage during advancement of said portion into engagement with and between the pressure-applying members of said first pair than during subsequent movement of said assemblage between said pressure-applying members of said first and second pairs.

22. The photographic apparatus of claim 21 wherein said one of said second pair of pressure-applying members comprises a roll and said apparatus includes means for rotating said roll in frictional engagement with said portion of said assemblage for advancing said portion of said assemblage into engagement with and beween said pressure-applying members of said first pair.

23. Photographic apparatus for exposing and thereafter treating with a fluid the photosensitive layer of each of a plurality of film assemblages, said apparatus comprising, in combination, means for positioning said film assemblages for exposure with at least a portion of each of said film assemblages arranged in overlying relation with portions of other assemblages, means for exposing the photosensitive layer of each of said assemblages, fluid-spreading means for engaging each of said assemblages and spreading said fluid between said photosensitive layer and another layer during movement of each said assemblage in engagement with said spreading means, guide means located adjacent said spreading means for supporting said portions of said assemblages and guiding said portions into engagement with said spreading means, pressure-applying means mounted adjacent said spreading means for movement with respect to said guide means, means for biasing said pressure-applying means toward said guide means into frictional engagement with at least one of said portions supported thereon, and manually operable means for so moving said pressure-applying means in frictional engagement with said one portion as to advance said one portion into engagement with said spreading means, said manually operable means including means for causing said pressure-applying means to apply greater compressive pressure to said one portion as said pressure-applying means is moved for advancing said one portion into engagement with said spreading means than during subsequent movement of the film assemblage comprising said one portion between said pressure-applying means and said support means and in engagement with said spreading means.

24. The photographic apparatus of claim 23 wherein said pressure-applying means comprises a pair of members and means for mounting said members for movement toward and away from said guide means, said manually operable means includes means for moving one of said members toward said guide means into frictional engagement with said one portion while simultaneously moving said one member so as to advance said one portion into engagement with said spreading means and move the other of said members, located intermediate said one member and said spreading means, away from said guide means, and means are provided for urging said other member toward said guide means for engaging and applying compressive pressure to said assemblage comprising said one portion during subsequent movement thereof between said guide means and said members and in engagement with said spreading means and urging said one member away from said guide means out of engagement with the last-mentioned assemblage.

25. The photographic apparatus of claim 24 wherein said one member comprises a roll mounted for rotation in frictional engagement with said film assemblage and said manually operable means includes means for rotating said roll in frictional engagement with said one portion for advancing said one portion between said other member and said guide means into engagement with said spreading means.

26. The photographic apparatus of claim 24 wherein said means for mounting said members comprises an element mounted intermediate said members for pivotal movement with respect to said guide means whereby pivotal movement of said element is operative for moving one of said members toward said guide means while displacing the other of said members away from said guide means, resilient means are provided for so biasing said element as to urge said other member toward said guide means, and said manually operable means includes means for pivoting said element against the bias of said resilient means for urging said one member toward said guide means into frictional engagement with said one portion.

27. The photographic apparatus of claim 26 wherein said one member comprises a roll mounted for rotation on said element, said manually operable means includes means for rotating said roll in frictional engagement with said one portion for advancing said one portion into engagement with said fluid-spreading means, and means for pivoting said element in the same direction as said roll for moving said roll toward said guide means into frictional engagement with said one portion.

28. The photographic apparatus of claim 27 wherein said element includes means for resisting the rotation of said roll.

29. In photographic apparatus for exposing a film assemblage and thereafter processing said assemblage with a fluid during withdrawal of said assemblage from said apparatus, in combination, means defining a housing for enclosing and positioning a film assemblage for exposure, means defining an opening in said housing through which said assemblage can be withdrawn, fluid-spreading means within said opening for engaging said assemblage and spreading a fluid processing composition between layers of said assemblage during withdrawal of said assemblage from said housing, guide means within said housing adjacent said spreading means for supporting and guiding said assemblage through said opening in engagement with said spreading means, said guide means including means for supporting at least a portion of said assemblage with the end of said portion positioned adjacent said fluid-spreading means, a first member mounted adjacent said guide means for movement with respect to said guide means, means for moving said first member toward said guide means into frictional engagement with said portion and moving said portion into engagement with said fluid-spreading means and from said housing through said opening, a second member mounted adjacent said guide means between said first member and said fluid-spreading means, and means for biasing said second member toward said guide means so as to apply compressive pressure to said assemblage during withdrawal movement of said assemblage from said housing in engagement with said fluid-spreading means.

30. The photographic apparatus of claim 29 wherein said guide means includes means for supporting said film assemblage with said end of said portion positioned intermediate said first and second members.

References Cited in the file of this patent

UNITED STATES PATENTS 2,477,304      Land _____ July 26, 1949

UNITED STATES PATENT OFFICE
CERTIFICATE OF CORRECTION

Patent No. 2,946,270                            July 26, 1960

Vaito K. Eloranta

It is hereby certified that error appears in the above numbered patent requiring correction and that the said Letters Patent should read as corrected below.

Column 5, line 19, for "leading" read -- trailing --; line 33, for "parallelpiped" read -- parallelepiped --; column 7, line 70, for "the", second occurrence, read -- as --; column 9, line 14, for "adapted" read -- adapter --.

Signed and sealed this 19th day of March 1963.

(SEAL)
Attest:

ESTON G. JOHNSON
Attesting Officer

DAVID L. LADD
Commissioner of Patents